United States Patent [19]
Machida

[11] Patent Number: 5,805,490
[45] Date of Patent: Sep. 8, 1998

[54] ASSOCIATIVE MEMORY CIRCUIT AND TLB CIRCUIT

[75] Inventor: Hirohisa Machida, Hyogo, Japan

[73] Assignee: Mitsubishi Denki Kabushiki Kaisha, Tokyo, Japan

[21] Appl. No.: 500,324

[22] Filed: Jul. 10, 1995

[30] Foreign Application Priority Data

Feb. 6, 1995 [JP] Japan ..................................... 7-018163

[51] Int. Cl.[6] ...................................................... G06F 7/50
[52] U.S. Cl. ..................................... 364/784.01; 395/435
[58] Field of Search ..................................... 364/784, 769, 364/786, 788, 784.01–784.05, 786.01, 786.04; 395/375, 435, 800, 400; 365/49

[56] References Cited

U.S. PATENT DOCUMENTS

| | | | |
|---|---|---|---|
| 4,639,888 | 1/1987 | Nussbaecher | 364/788 |
| 5,072,377 | 12/1991 | Asai et al. | 395/400 |
| 5,247,627 | 9/1993 | Murakami et al. | 395/375 |
| 5,386,528 | 1/1995 | Ando et al. | 395/400 |
| 5,418,736 | 5/1995 | Widigen et al. | 364/786 |
| 5,457,788 | 10/1995 | Machida | 395/435 |
| 5,485,418 | 1/1996 | Hiraki et al. | 365/49 |
| 5,497,468 | 3/1996 | Tani et al. | 395/375 |
| 5,517,440 | 5/1996 | Widigen et al. | 364/786 |

OTHER PUBLICATIONS

IEEE Transactions on Computers, vol. 41, No. 11, pp. 1484–1488, Nov. 1992, Jordi Cortadella, et al., "Evaluation of A+B=K Conditions Without Carry Propagation".

PR4000 Microprocessor Users Manual, pp. 3–2–3–3, Sep. 1991.

MIPS RISC Architecture, pp. 2–12–2–13, Aug. 1988, Gerry Kane.

*Primary Examiner*—Reba I. Elmore
*Assistant Examiner*—Monica Lewis
*Attorney, Agent, or Firm*—Oblon, Spivak, McClelland, Maier & Neustadt, P.C.

[57] ABSTRACT

A TLB circuit includes a memory circuit and a FAC-CAM circuit, a kind of associative memory. The FAC-CAM circuit receives two data entries, and computes a virtual address while comparing the virtual address with prescribed values stored therein. As the result of the comparison, when the prescribed value which is coincident with the virtual address is found, at least one of a group of coincidence signals is activated and a hit signal is outputted. Thus, the associative memory utilizing the FAC circuit enables a high-speed addition operation and comparison.

18 Claims, 14 Drawing Sheets

FIG. 11

|  | EMBODIMENT 1 | EMBODIMENT 3 |
|---|---|---|
| 12-BIT ADDER | 360<br>(30×12) | 360 |
| FAC CIRCUIT | 71680<br>(56×20×2×32) | 24320<br>(40×19×32) |
| SELECTION CIRCUIT | 320<br>(10×32) | 320 |
| HALF-ADDER | 0 | 320<br>(16×20) |
| OTHERS<br>(COMPARISION NOR<br>CIRCUIT etc.) | 1280<br>(40×12) | 3136<br>((40+8+20+30)×32) |
| TOTAL | 73640 | 28136 |

ASSOCIATIVE MEMORY CIRCUIT AND TLB CIRCUIT

BACKGROUND OF THE INVENTION

1. Field of the Invention

The present invention relates generally to an associative memory circuit, and more particularly to a TLB (Translate Lookaside Buffer) circuit for address translation.

2. Description of the Background Art

The execution of a computer instruction generally consists of steps of fetching the instruction (reading out) from memory, decoding the instruction (interpreting), fetching any required operands from memory, performing the required operation on the operands and writing back results to memory. On completing a sequence of above steps, the next instruction is fetched.

An obvious method to speed up a computer process is to overlap several continuous instructions to be executed on the time axis so that all of the constituents of the computer should be always active. The practical realization is a pipeline processing.

FIGS. 12 and 13 are schematic views of a pipeline processing. An typical computer instruction is executed in several separate steps. FIG. 12 illustrates separation of the instruction execution of MIPS R3000 Processor developed by MIPS (hereinafter R3000: see a detailed discussion in "MIPS RISC Architecture" by Gerry Kane).

The execution of an R3000 instruction consists of five steps (stages) as follows:

(i) IF: Fetch the instruction
(ii) RD: Read any required operands from registers while decoding the instruction
(iii) ALU: Perform the required arithmetic and logic operation on instruction operands
(iv) MEM: Access memory
(v) WB: Write back results to register file In Stage RD, some operands are fetched from memory and others from registers. That results from a high-performance processor of recent model which loads operands from external memory into internal register file and then fetches operands from the register file to perform the arithmetic and logic operation, instead of performing operation on the operands of external memory in an ALU (Arithmetic and Logic Unit). Operation results are written back to the register file and then data of the register file are stored in external memory. An operand is more likely to be used many times, and therefore, holding the operand in register file which allows quick access to data is more efficient than holding the same in external memory. Furthermore, for higher performance, there may be a case where cache memory is provided when access to external memory is made.

When the execution of instruction consists of five steps as above, different CPU resources are utilized for different steps. Accordingly, different steps of different instructions can be performed simultaneously. FIG. 13 illustrates the overlapping of the steps. For example, "RD" of the instruction 1 can be overlapped with "IF" of the instruction 2. Up to five stages can be overlapped.

Consequently, although an instruction requires five stages to be completed, completion of instruction takes place every one stage is done from the viewpoint of the processor on the whole. Such a processing is called 5-stage pipeline.

In R3000, each stage is broken down into smaller steps. FIG. 14 is a schematic view of more detailed steps of the R3000 instruction. The execution of an instruction consists of eleven steps as follows:

(a) ITLB: Translate the virtual address of the instruction into physical address
(b) IMEM: Fetch the instruction from the physical address obtained through translation in (a)
(c) IADD: Compute the virtual address of the branch target
(d) RD: Read any required operands for instruction execution from register file
(e) DEC: Decode the instruction
(f) ALU: Perform the arithmetic and logic operation
(g) B: Judge whether or not a branch must be taken
(h) DADD: Compute the virtual address of the operand
(i) DTLB: Translate the virtual address of the operand into physical address
(j) DMEM: Fetch the operand from the physical address obtained through translation in (i), and if necessary, write back the operand
(k) WB: Write back results to register file In an execution of instruction, a plurality of steps overlap when performed. As shown in FIG. 14, Stages "RD", "DEC" and "IADD" are performed simultaneously, Stages "DADD" and "DTLB" are performed while Stage "ALU" is performed and further Stages "DADD" and "B" are performed simultaneously.

The relation between the eleven steps of FIG. 14 and the five steps of FIGS. 12 and 13 is expressed as:

Stage (a) and Stage (b) (the first half) . . Stage (i)
Stage (b) (the second half) and Stage (d), Stages (e) and (c) . . . Stage (ii)
Stage (f), Stages (g), (h) and (i) . . . Stage (iii)
Stage (j) . . . Stage (iv)
Stage (k) . . . Stage (v)

Branch instruction is likely to cause the most serious problem for pipeline processing. In ordinary processing, a program counter is incremented by 1 every fetch of instruction, thereby performing instructions in order of addresses. Obviously, when the execution of branch instruction causes fetching an instruction out of the address order, any of instructions following the branch is fetched from wrong address.

For example, if the instruction 1 is a branch instruction in the instruction sequence of FIG. 13, the branch is judged in Stage "B" (the first half of Stage "ALU" of FIGS. 12 and 13) as illustrated in FIG. 14. Then, it is determined whether or not a branch must be taken. If a branch must be taken, the right address for the instruction to be executed will be available in Stage "IF" of the instruction 3 but is not available in "IF" of the instruction 2, causing wrong execution of the instruction 2.

To avoid such a situation, the technique most used is to provide instructions that can be executed regardless of the result of the branch of the instruction 1 as the instruction 2. This technique is called a delayed branch, and the instruction 2 is placed in a delay slot.

In general, a software called a compiler fills the delay slot with the instructions. If no instruction that can be executed regardless of the result of the branch of the instruction 1 is found (by the compiler), a NOP which is an instruction to perform nothing must be inserted. The NOPs cause degradation of the performance of the overall processor.

As mentioned earlier, the recent-model processor loads operands from external memory into register file and then performs the arithmetic and logic operation on the operand fetched from register file, instead of directly performing the operation on the operand fetched from external memory. Operation results are written to register file and then the data from register file are stored into external memory.

If the instruction 1 of FIG. 13 is a load instruction for loading operands from external memory into register file, the operands loaded from external memory are written into register file in Stage "WB" of the instruction 1. In this case, no operand is stored in register file yet in the first half of Stage "ALU" of the instruction 2.

Therefore, such an instruction as must utilize the operands which are loaded into register file by the instruction 1 can not be placed in the position of the instruction 2. That is, it is necessary to place such an instruction as need not utilize the operands which are loaded by the instruction 1 in the position of the instruction 2. If such an instruction is not found by the compiler, a NOP is also placed as in the previous case. The location of the instruction 2 is called a load slot (load delay).

Thus, provision of NOPs causes degradation of pipelined computer.

In a pipelined computer, it is important that the pipeline stages should require equal execution time. FIG. 15 is a schematic view of a pipelined processing, in which different execution times are required. In this case, longer execution time determines the overall execution time of the instruction.

One of the used methods is to break the stage requiring longer execution time down into smaller stages. Increase in the number of stages, however, causes an increase in the number of delay slots.

R3000 can execute a pipeline stage at up to 40 MHz (25 nsec). Further research aiming for equal execution time of pipeline stages has led to a development of R4000.

FIG. 16 is a schematic view of the R4000 pipeline architecture. R4000 has an 8-stage pipeline architecture, and its operation speed for each stage is up to 150 MHz (6.7 nsec). In Stages "ITC" and "DTC", instruction tag and data tag are checked, respectively.

Since the execution time for each stage is cut, steps which can not be executed in one stage, such as "ITLB", "DTLB", "IMEM" and "DMEM", are broken down into two stages. These steps require memory access, so they require twice as long time as other steps do.

R4000 achieves a great improvement in operation speed for each stage, but it needs 2-stage delay slot (R3000 needs 1-stage delay slot) and 3-stage load delay (R3000 needs 1-stage load delay) due to broken stages. Accordingly, in R4000, there occurs more cases of inserting the instructions to perform nothing.

Studying the R4000 instruction architecture, it is found that speeding up of executions of the stages in which memory access is needed, such as "ITLB", "DTLB", "IMEM" and "DMEM", is critical to improvement in the operation speed for the stages necessary for the computer processing.

Considering that the operation speed for each stage of R4000 is up to 150 MHz, it seems that R3000 can operate at the speed of up to 75 MHz since the "IMEM" and "DMEM" each require 1-cycle processing and most of other stages require half-cycle processing, as shown in FIG. 14. In order to achieve this speed, however, "ITLB" constituting the "IF" with the first half of the "IMEM" and the "DTLB" executed in the second half of the "ALU" must be completed in a half cycle. That is very difficult as seen from the case of R4000 shown in FIG. 16.

Then, speeding up of the "TLB" processing is considered. Before the examination, brief discussion of the "TLB" processing will be presented. Since a 32-bit type computer is widely used in recent, the discussion will be presented, taking the 32-bit type computer by way of example.

In the 32-bit computer, the number of address spaces therein is 32-th power of 2, i.e., about 4 billion. Since each address consists of 8-bit data, the 32-bit computer requires 32 billion-bit memory. This is considerably strict number to accomplish, although not impossible. Even if this is possible, the number of bits required for a 64-bit computer (e.g., R4000) would become astronomical figures, and accordingly, it is impossible to provide it as a hardware. Moreover, it is beyond imagination that one software may use all of the areas at a time.

Then, the concept of virtual memory is introduced. The virtual memory does not provide so much physical memories as correspond to all of the address spaces, but it seems as if uses all of the address spaces (32 billion bits) with only a small memories. All of the addresses are called virtual address and the limited addresses are called physical address.

The virtual address is generally obtained by addition operation performed in a prescribed manner. FIG. 17 is a schematic view of a structure of load instruction LB which is one of the instructions of R2000. The structure is discussed in A-35 of "MIPS RISC Architecture" by Gerry Kane. The area "base" in the range of 21th through 25th bits specifies a register file. By adding a value of area "offset" in the range of 0th through 15th bits to a 32-bit value stored in the register file specified by the area "base", a virtual address is obtained. The load instruction LB is an instruction to transfer data stored in memory at the physical address corresponding to the virtual address obtained by addition operation as above to a register file specified by "rt" in the range of 16th through 20th bits.

R3000 performs an address translation of the virtual address into the physical address by using 20 high-order bits of the 32 bits. That is, data processing is performed with the virtual address in a processor and actual memory access is performed with the physical address obtained by address translation. A circuit for performing the address translation is called a TLB (Translate Lookaside Buffer) circuit. The TLB circuit inputs the 20 high-order bits of the virtual address and judges whether or not the inputted 20-bit value coincides with a value held therein. In case of coincidence, 20-bit physical address into which the virtual address should be translated is obtained from a table.

FIG. 18 is a block diagram showing a configuration of a TLB circuit 90. The TLB circuit 90 is comprised of a memory circuit 101 called a CAM (Content Addressable Memory) circuit and a memory circuit 4. The memory circuit 101 is provided with a virtual address 102 through a prescribed addition operation.

Although the memory circuit 4 operates as an ordinary memory circuit does, it does not include a decoder circuit, unlike the ordinary memory circuit, since it has no need to generate a word selection signal by means of the decoder circuit or the like. Instead of the word selection signal, however, the memory circuit 4 is supplied with a group of coincidence signals 5 by the CAM circuit 101.

The CAM circuit 101 is a kind of associative memory. The associative memory has a function of comparing the data stored therein with the data externally received, besides storing therein and reading out therefrom the data externally received.

When the CAM circuit 101 holds the data which coincides with the virtual address 102 externally received, a hit signal 8 is outputted from the TLB circuit 90. Meanwhile, the information as to which number of word of the CAM circuit 101 the coincident data is stored in is transferred to the memory circuit 4 by means of the group of coincidence signals 5.

Thus, when the TLB circuit 90 receives the virtual address 102 from outside, the CAM circuit 101 performs a comparison between the virtual address 102 and the stored data, and if the data coincident with the virtual address 102 is found, at least one of the group of coincidence signals 5 becomes "1" and the hit signal 8 also becomes "1" to inform success of address translation to an external processor.

Then, the data stored in the memory circuit 4 at the address corresponding to the coincidence signal of "1" among the group of signals 5 is fetched as a physical address 7 corresponding to the virtual address 102. In other words, the memory circuit 4 corresponds to the "table" as mentioned earlier.

When the inputted virtual address 102 coincides with no data stored in the CAM circuit 101, the hit signal 8 becomes "0" to inform failure of address translation of the virtual address into physical address to the processor.

Since the concept of virtual address is essential for the memory-management system in a system utilizing a microprocessor, the TLB circuit 90 as mentioned above is an indispensable component of a processor. For example, in the R3000 pipeline activity, the addition operation to obtain a virtual address in Stage "DADD" and the address translation of the virtual address 102 into the physical address 7 in "DTLB" must be performed before an external memory access. That is, the time required for obtaining the physical address 7 is twice as long as the time required for obtaining the virtual address 102 through the prescribed addition operation.

The background art, as discussed above, has a problem of reduced processor performance due to long execution time since external memory access can be made only after performing the prescribed addition operation to obtain the virtual address and the address translation by the TLB circuit.

SUMMARY OF THE INVENTION

The present invention is directed to an associative memory circuit for performing an addition operation of a first value, which consists of a first number of first high-order bits and a second number of first low-order bits, and a second value, which consists of a third number, which is less than the first number, of second high-order bits and the second number of second low-order bits, and judging whether or not a result of the addition operation coincides with comparison values each having the first number of bits.

According to the first aspect of the present invention, the associative memory circuit comprises: (a) an adder for generating a carry signal to indicate whether or not a result of an addition operation of the first low-order bits and the second low-order bits generates a carry to be propagated out of the second number of bits; (b) coincidence judging circuits provided corresponding to the comparison values, each for outputting a coincidence signal to indicate whether or not a result of an addition operation of the first high-order bits and the second high-order bits, where the first and second high-order bits are lower-bit aligned or "flush" and a logical value of the carry signal is further added to a least significant bit thereof, coincides with corresponding one of the comparison values, wherein each of the coincidence judging circuits has (b-1) a first FAC circuit for outputting a first candidate for the coincidence signal to indicate whether or not a result of the addition operation of the first high-order bits and the second high-order bits, and a logical value "0" coincides with the corresponding one of the comparison values; (b-2) a second FAC circuit for outputting a second candidate for the coincidence signal to indicate whether or not a result of the addition operation of the first high-order bits and the second high-order bits and a logical value "1" carry coincides with the corresponding one of the comparison values; and (b-3) a selection circuit for outputting either the first candidate or the second candidate as the coincidence signal according to the carry signal. When the first and second high-order bits are lower-bit aligned (or "flush"), the least significant bits of the third number of second high-order bits are aligned with the least significant bits of the third number of first high-order bits during the addition operation.

According to the second aspect of the present invention, in the associative memory circuit of the first aspect, both the first FAC circuit and the second FAC circuit include (x-1) FAC elements provided as much as the first number of bits, each of which having (x-1-1) a storage element for storing 1-bit comparison value which forms the corresponding one of the comparison values; (x-1-2) a half-adder for receiving a first 1-bit value forming the first high-order bits and a second 1-bit value forming the second high-order bits, and outputting an addition result which is an exclusive logical sum of the first 1-bit value and the second 1-bit value and a resultant carry which is a logical product of the first 1-bit value and the second 1-bit value, in which a prescribed operation using the addition result, the resultant carry and the 1-bit comparison value is performed to output first output and second output in each of the FAC elements, and (x-2) coincidence signal candidate generator means for outputting a logical product of logic inversions of the first outputs as the first candidate for the coincidence signal in the first FAC circuit and outputting the same as the second candidate for the coincidence signal in the second FAC circuit. The prescribed operation in each of the FAC elements comprises the steps of: (y-1) taking a logical product of the addition result and a logic inversion of the 1-bit comparison value to obtain a first operation result; (y-2) taking a logical sum of the first operation result and the resultant carry to obtain the second output; (y-3) taking an exclusive logical sum of the addition result and the 1-bit comparison value to obtain a second operation result; and (y-4) taking an exclusive logical sum of the second output from a next lower one of the FAC elements and the second operation result to obtain the first output. The second output from the next lower one of the FAC elements for the lowest FAC element corresponds to the logical value "0" in the first FAC circuit and corresponds to the logical value "1" in the second FAC circuit.

According to the third aspect of the present invention, in the associative memory circuit of the second aspect, the half-adders are common to the first FAC circuit and the second FAC circuit by bit to constitute a group of half-adders.

According to the fourth aspect of the present invention, in the associative memory circuit of the third aspect, all of the FAC elements are common by bit to the first FAC circuit and the second FAC circuit. Each of the FAC elements not corresponding to the least significant bit further includes (x-1-3) an AND circuit for outputting the first operation result; (x-1-4) an OR circuit for outputting the second output; (x-1-5) a first EX-OR circuit for outputting the second operation result; and (x-1-6) a second EX-OR circuit for outputting the first output. The FAC element corresponding to the least significant bit further include (x-1-7) an AND circuit for outputting the first operation result; (x-1-8) an OR circuit for outputting the second output; and (x-1-9) a first EX-OR circuit for outputting the second operation result. Each of the coincidence judging circuits further has (b-4) a first transfer element for transferring the second operation result of the FAC element corresponding to the least significant bit as the first output of the FAC element corresponding to the least significant bit of the first FAC circuit; (b-5) a second transfer element for transferring the second operation result of the FAC element corresponding to the least significant bit as the first output of the FAC element corresponding to the least significant bit of the second FAC circuit. The coincidence signal candidate generator means includes (x-2-1) a first logical element for outputting a logical sum of the first outputs of the FAC elements not corresponding to the least significant bit; (x-2-2) a second logical element for outputting an inverted logical sum of an output from the first transfer element and an output from the first logical element as the first candidate for the coincidence signal; and (x-2-3) a third logical element for outputting an inverted logical sum of an output from the second transfer element and the output of the first logical element as the second candidate for the coincidence signal.

According to the fifth aspect of the present invention, the associative memory circuit of the first aspect further comprises: (c) a hit signal generator means for outputting a hit signal by taking a logical sum of all of the coincidence signals.

The present invention is also directed a TLB circuit. According to the sixth aspect of the present invention, the TLB circuit comprises: the associative memory circuit of any of the first to fifth aspects; and a memory circuit for storing physical addresses corresponding to the comparison values of the associative memory circuit, which is defined as addresses. In the TLB circuit, the result of the addition operation of the first value and the second value is obtained as a virtual address and the virtual address is translated into the physical address by using the coincidence signal.

In the associative memory circuit in accordance with the first aspect of the present invention, the first FAC circuit performs the addition operation of said first high-order bits and said second high-order bits on the assumption that no carry is generated as the result of the addition operation of the first low-order bits and the second low-order bits and judges whether or not the result of the addition operation coincides with the comparison value. The second FAC circuit performs the addition operation of said first high-order bits and said second high-order bits on the assumption that a carry is generated as the result of the addition operation of the first low-order bits and the second low-order bits and judges whether or not the result of the addition operation coincides with the comparison value. The computations of high-order bits by the first and second FAC circuits are simultaneously performed with the addition operation of low-order bits by the adder.

Thus, judgment as to whether or not the result of the addition operation of the first value and the second value coincides with the comparison value is made with high speed.

In the associative memory circuit in accordance with the second aspect of the present invention, a carry is propagated to only one bit higher when the addition operation of the first high-order bits and the second high-order bits is performed by bit both in the first and second FAC circuits.

Thus, judgment as to whether or not the result of the addition operation of the first value and the second value coincides with the comparison value is made with much higher speed.

In the associative memory circuit in accordance with the third aspect of the present invention, the group of half-adders supplies the first and second FAC circuits in any of the coincidence judging circuits with the addition result and the resultant carry.

Thus, the number of elements can be reduced by avoiding operational duplication of computing the addition result and the resultant carry.

In the associative memory circuit in accordance with the fourth aspect of the present invention, the FAC element is common to the first and second FAC circuits in each of the coincidence judging circuits to obtain the first and second outputs by bit.

Thus, the number of elements can be further reduced by avoiding the operational duplication of obtaining the first and second outputs.

In the associative memory circuit in accordance with the fifth aspect of the present invention, the hit signal is activated when the result of the addition operation of the first value and the second value coincides with any of the comparison values.

Thus, it is possible to know whether or not the result of the addition operation of the first and second values coincides with the comparison value by the hit signal.

In the TLB circuit in accordance with the sixth aspect of the present invention, whether or not there is a physical address corresponding to the virtual address can be judged by the coincidence signal.

Thus, since the coincidence signal can be obtained with high speed by the associative memory circuit of the present invention, a high-speed address translation of the virtual address into the physical address can be achieved.

An object of the present invention is to provide a TLB circuit which is capable of performing a prescribed addition operation therewithin to obtain the virtual address so as to reduce the execution time required for data processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a comparison table for presenting an effect of the third preferred embodiment of the present invention;

FIGS. 12 to 17 are schematic views showing a background art; and

DESCRIPTION OF THE PREFERRED EMBODIMENTS

The First Preferred Embodiment

Figure 1:
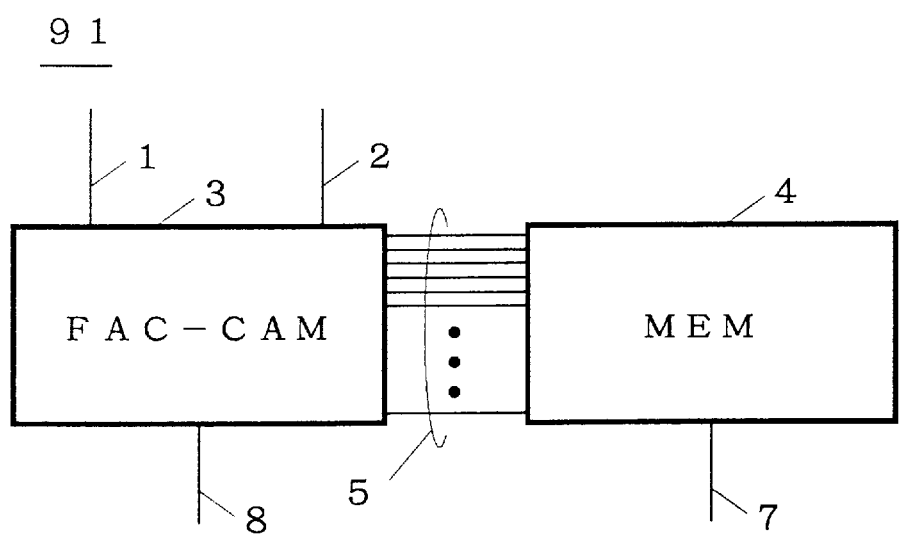
FIG. 1 is a block diagram showing a configuration of a TLB circuit 91 in accordance with the present invention.

FIG. 1 is a block diagram showing a configuration of a TLB circuit 91 which is one of memory circuits in accordance with the present invention. The TLB circuit 91 comprises a FAC-CAM circuit 3 instead of the CAM circuit 101 of the TLB circuit 90 in the background art. The FAC-CAM circuit 3 also outputs a group of coincidence signals 5 and a hit signal 8 like the CAM circuit 101.

Unlike the CAM circuit 101, however, the FAC-CAM circuit 3 does not receive the virtual address 102. Instead of this, two kinds of data 1 and 2 are applied to the FAC-CAM circuit 3 to generate the virtual address. The data 1 corresponds to a 32-bit value stored in the register file which is specified by the area "base" of the load instruction LB in the background art and the data 2 corresponds to a 16-bit value in the area "offset" of the load instruction LB. An addition operation of the data 1 and 2 is performed to generate a virtual address.

Detailed discussions of memories and of a readout circuit not directly relevant to the present invention will be omitted.

Figure 2:
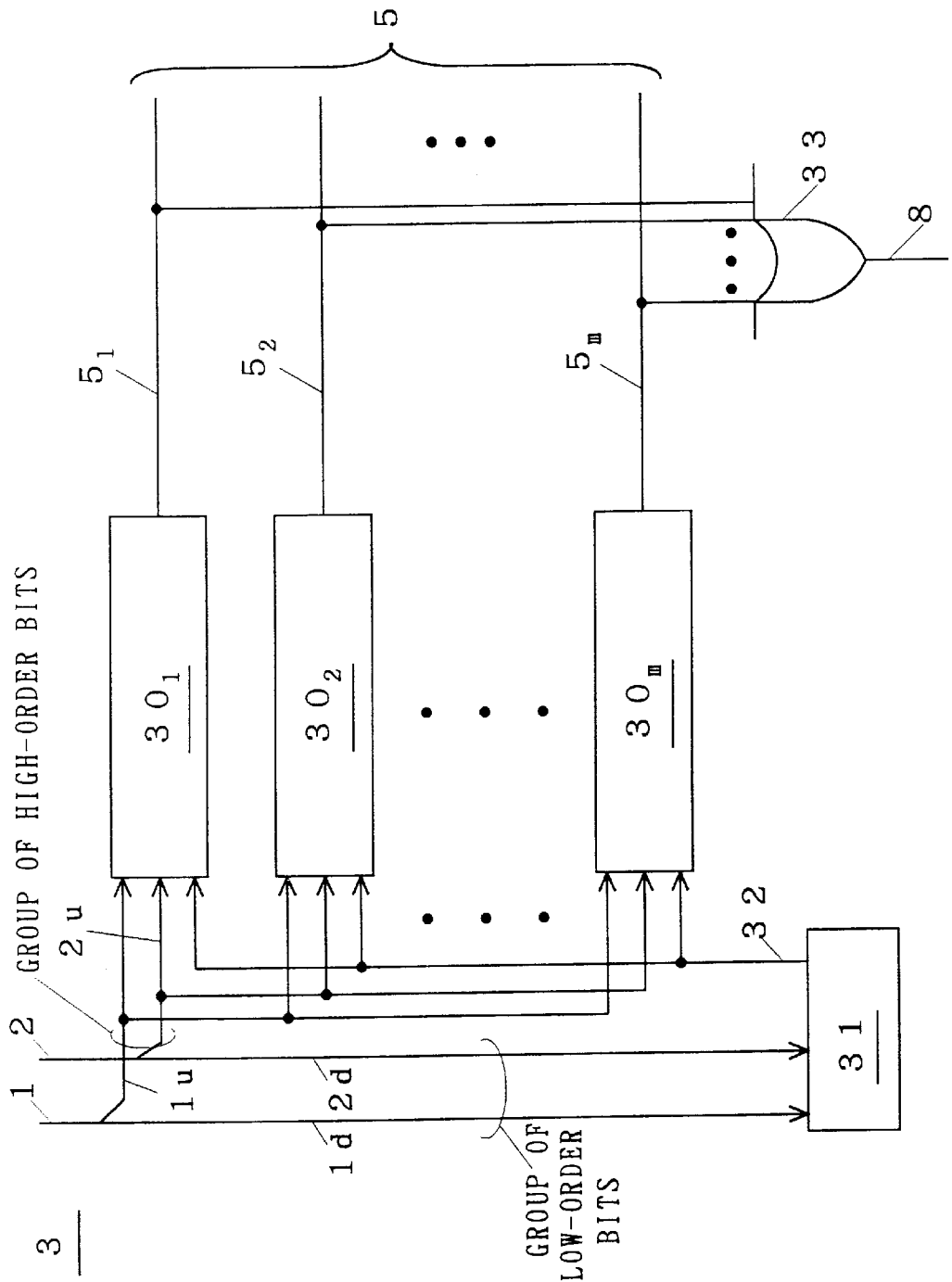
FIGS. 2 and 3 are block diagrams showing a first preferred embodiment of the present invention.

FIG. 2 is a block diagram illustrating a configuration of the FAC-CAM circuit 3. The FAC-CAM circuit 3 is comprised of the first improved FAC circuits $30_i$ (i=1, 2, ..., m), an adder 31 and an OR circuit 33. The "improved" FAC circuit has been improved as compared with the well-known FAC circuit (Fast Adder-Comparator) discussed later. The number m of the first improved FAC circuits $30_i$ coincides with the number of physical addresses which the virtual address may be translated into.

The first improved FAC circuits $30_i$ receive a group of high-order bits of the data 1 and 2 and the adder 31 receives a group of low-order bits of the data 1 and 2. For example, in R3000, 32-bit value is used for the data 1 and 16-bit value for the data 2. The group of high-order bits consists of the 20 high-order bits $1u$ of the data 1 and the 4 high-order bits $2u$ of the data 2, and the group of low-order bits consists of the 12 low-order bits $1d$ of the data 1 and the 12 low-order bits $2d$ of the data 2.

The adder 31 performs an addition operation of the group of low-order bits of the data 1 and 2 and then transfers information as to whether or not a carry is generated as the result of the addition operation to the first improved FAC circuits $30_i$ by means of a carry signal 32. The group of high-order bits of the data 1 and 2 and the carry signal 32 are inputted to all of the first improved FAC circuits $30_i$ in parallel.

Each of the first improved FAC circuits $30_i$ outputs a coincidence signal $5_i$. The coincidence signals $5_i$ constitute the group of coincidence signals 5. The OR circuit 33 outputs the hit signal 8 by taking the logical sum of the group of coincidence signals 5.

Figure 3:
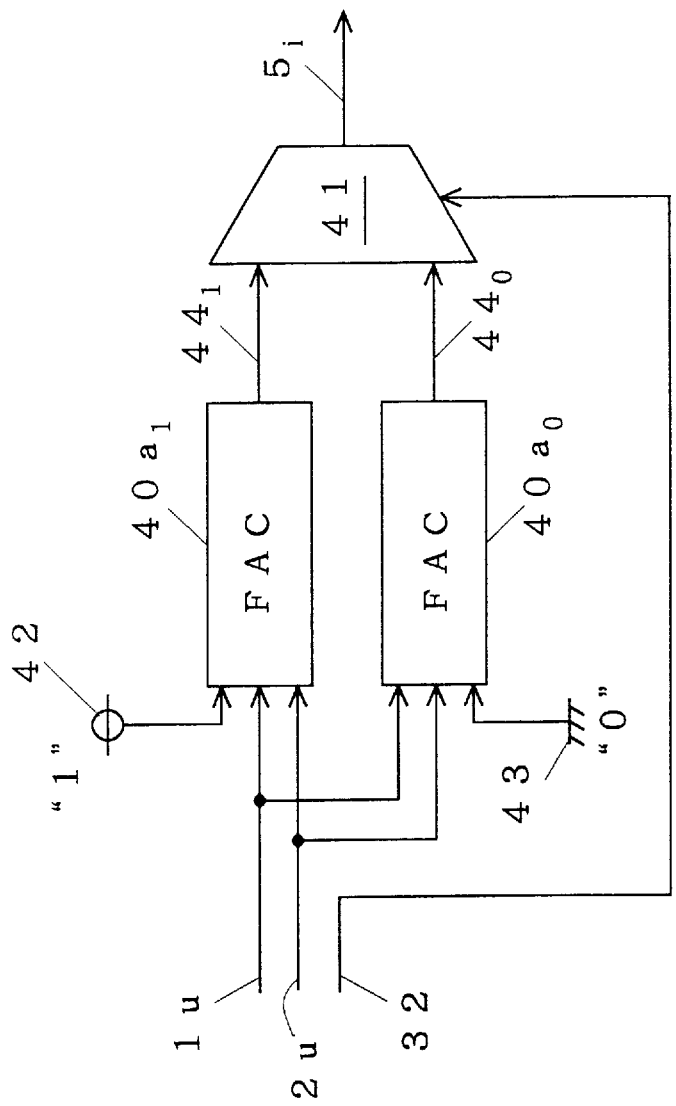

FIG. 3 is a block circuit showing a configuration of the first improved FAC circuit $30_i$. Each of the first improved FAC circuits $30_i$ is comprised of a well-known FAC circuits $40a_0$ and $40a_1$, a potential point 42 with a potential of logical value "1", a potential point 43 with a potential of logical value "0" and a selection circuit 41 for outputting either the output $44_0$ from the FAC circuit $40a_0$ or the output $44_1$ from the FAC circuit $40a_1$.

The data 1 and 2 are inputted to the FAC circuits $40a_0$ and $40a_1$ in parallel. The FAC circuit $40a_0$ performs a logic operation of the data 1 and 2 and the logical value "0" to obtain the output $44_0$, and the FAC circuit $40a_1$ performs a logic operation of the data 1 and 2 and the logical value "1" to obtain the output $44_1$. The FAC circuits $40a_0$ and $40a_1$ store the same value and compare the result of the logic operation with the stored value. Each of the outputs $44_0$ and $44_1$ takes either "1" or "0" depending on whether the comparison result is agreement or disagreement.

Figure 4:
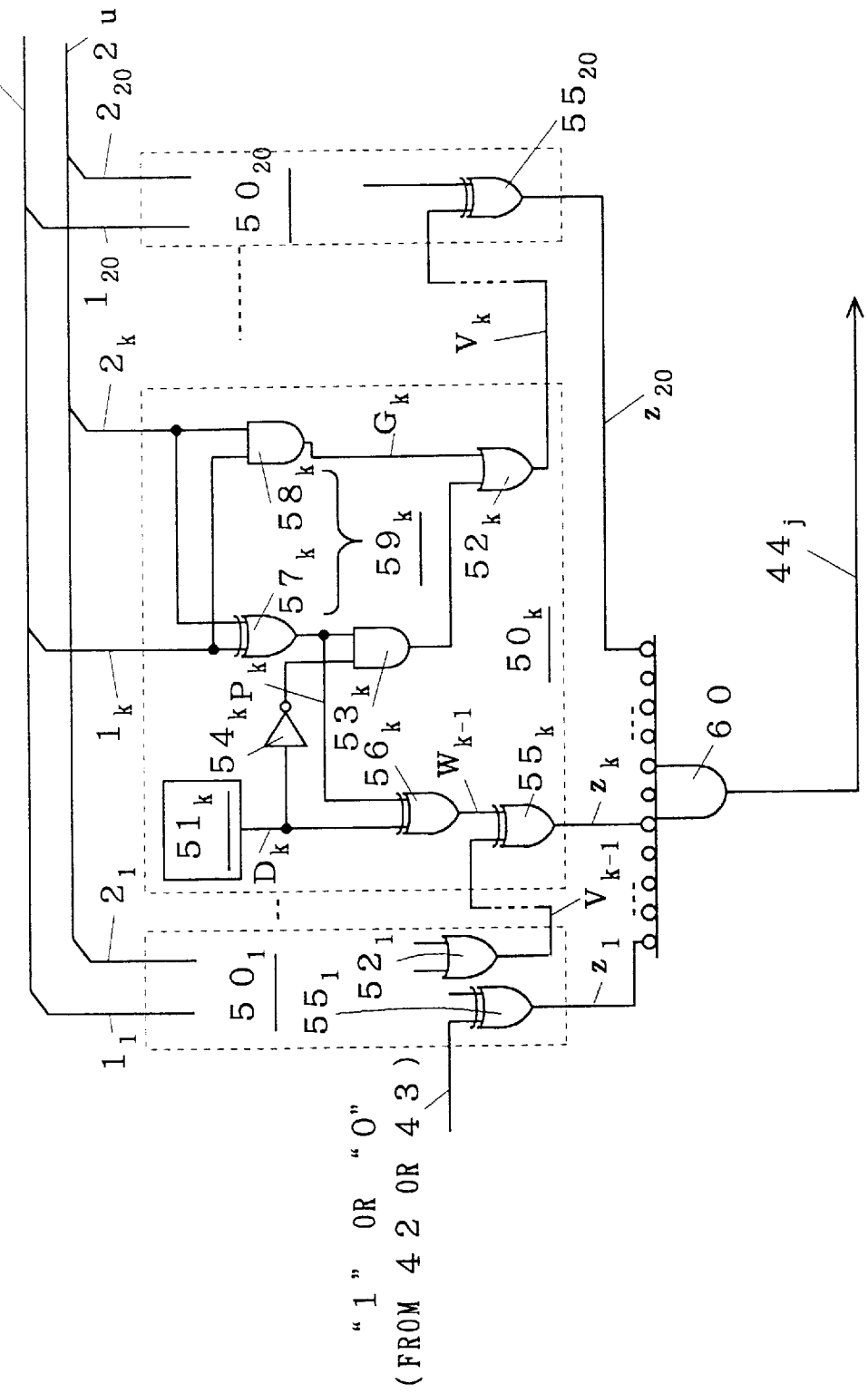
FIG. 4 is a circuit diagram showing the first preferred embodiment of the present invention.

FIG. 4 is a circuit diagram showing a configuration of a FAC circuit $40a_j$ (j=0, 1). Each of the FAC circuits $40a_j$ is comprised of 1-bit FAC element $50_k$ (k=1, 2, ..., 20) and an NOR circuit 60 with 20-bit input. The number of the FAC elements $50_k$ in each FAC circuit $40a_j$ coincides with the number of high-order bits, i.e., 20 herein. The number of input ends of the NOR circuit 60 is determined in like manner. In FIG. 4, an arrangement is made so that the FAC element $50_k$ as disposed further left should correspond to the lower-order bit.

Each of the FAC elements $50_k$ is comprised of a storage element $51_k$ for storing the value which is stored in the CAM circuit 101 in the background art by bit, an OR circuit $52_k$, an AND circuit $53_k$, a NOT circuit $54_k$, EX-OR circuits $55_k$ and $56_k$, and an EX-OR circuit $57_k$ and an AND circuit $58_k$ which constitute a half-adder $59_k$.

The half-adder $59_k$ is provided with the k-th 1-bit values $1_k$ and $2_k$ from the bottom of the high-order bits $1u$ and $2u$ of the data 1 and 2. The carry $G_k$ of the half-adder $59_k$ is applied to one input end of the OR circuit $52_k$, and the sum $P_k$ of the half-adder $59_k$ is applied to one input end of the AND circuit $53_k$ and one input end of the EX-OR circuit $56_k$.

The stored value $D_k$ of the storage element $51_k$ is applied to the other input end of the EX-OR circuit $56_k$ and the input end of the NOT circuit $54_k$. The output from the NOT circuit $54_k$ is applied to the other input end of the AND circuit $53_k$. The output from the AND circuit $53_k$ is applied to the other input end of the OR circuit $52_k$. The output from the OR circuit $52_k$ is a carry $V_k$ outputted from the FAC element $50_k$.

One input end of the EX-OR circuit $55_k$ receives the output $W_{k-1}$ from the EX-OR circuit $56_k$. The other input end of the EX-OR circuit $55_k$ receives the value "1" or "0" when k=1. Specifically, in the FAC element $50_1$ of the FAC circuit $40a_0$, the other input end of the EX-OR circuit $55_1$ is provided with "0", while in the FAC element $50_1$ of the FAC circuit $40a_1$, the other input end of the EX-OR circuit $55_1$ is provided with "1". The inputs "1" and "0" are supplied by the potential points 42 and 43, respectively.

When k>1, the other input end of the EX-OR circuit $55_k$ is provided with a carry $V_{k-1}$ from the OR circuit $52_{k-1}$ of the FAC element $50_{k-1}$.

All of the outputs $z_k$ of the EX-OR circuits $55_k$ of the FAC elements $50_k$ are applied to the input ends of the NOR circuit 60, and then the logical product of the logic inversions of these inputs is obtained as an output $44_j$.

The output $z_k$ from the EX-OR circuit $55_k$ of the FAC element $50_k$ only depends upon the carry $V_{k-1}$ of the FAC element $50_{k-1}$, the stored value $D_k$ of the storage element $51_k$, 1-bit value $1_k$ of the data 1 and 1-bit value $2_k$ of the data 2, not upon the operation result of the FAC element $50_n$ (n<k−1) which is lower than the FAC element $50_{k-1}$. In other words, the carry of the FAC circuit $40a_j$ propagates to the next higher bit only. Therefore, the addition operation of the high-order bits $1u$ and $2u$ of the data 1 and 2 and comparison between the addition result and the 20-bit value dependent on the stored value $D_k$ of the storage element $51_k$ are performed with higher speed.

The FAC circuit which is capable of performing addition operation and comparison together as above is discussed in "Evaluation of A+B=K Conditions Without Carry Propagation" (JCS, Vol. 41, No. 11, pp 1484–1488). Utilization of the FAC circuit enables performance of addition operation and comparison together with high speed. The reason will be discussed in accordance with the above document:

The result of the addition operation of the high-order bits $1u$ and $2u$ of the data 1 and 2 is given as R=($r_s$, $r_{s-1}$, ..., $r_1$), where s represents the number of the high-order bits, i.e., s is equal to 20 herein. The value to be compared is given as K=($D_s$, $D_{s-1}$, ..., $D_1$). To obtain the result E=1 when R=K and otherwise E=0, obviously E should be defied as $$E=E_s$$
$$(E_k=e_1 \cdot e_2 \cdot \ldots \cdot e_k)$$

where $$e_k = \overline{r_k \oplus D_k}$$
$$r_k = P_k \oplus C_{k-1}$$
$$C_k = (P_k \cdot C_{k-1}) + G_k$$
$$C_0 = 0$$
$$G_k = A_k \cdot B_k$$
$$P_k = A_k \oplus B_k \tag{1}$$

where "·" represents a logical product and "⊕" represents an exclusive logical sum.

The 1-bit values $1_k$ and $2_k$ of the data 1 and 2 are assumed to be $A_k$ and $B_k$, respectively.

On the other hand, from the configuration of the FAC element $50_k$, obtained are $$V_k = (P_k \cdot \overline{D_k}) + G_k$$
$$W_{k-1} = P_k \oplus D_k$$
$$Z_k = V_{k-1} \oplus W_{k-1} \tag{2}$$

where "+" represents a logical sum.

Hence, if it can be shown that the following equation (3) is equal to E, it can be proved that it is possible for the FAC circuit $40a_j$ to perform addition operation and comparison together.

$$Z = Z_s$$
$$(Z_k = \overline{z_1} \cdot \overline{z_2} \cdot \ldots \cdot \overline{z_k}) \tag{3}$$

For simplicity, discussion will start with the FAC circuit $40a_0$ in which $V_0=0$. When k=1, from Equations (2), obtained is $$Z_1 = \overline{z_1} = \overline{V_0 \oplus W_0} = \overline{W_0} = \overline{P_1 \oplus D_1} \tag{4}$$

Then, the following equation (5) is true:

$$E_1 = e_1 = \overline{r_1 \oplus D_1} = \overline{P_1 \oplus D_1} \tag{5}$$

Therefore, it can be found that when k=1, Z=E, i.e., $Z_1=E_1$.

Assuming that $Z_{k-1}=E_{k-1}$ is true, obtained is $$E_k = e_k \cdot E_{k-1}, \quad Z_k = \overline{z_k} \cdot Z_{k-1} \tag{6}$$

Therefore, if $Z_{k-1}=E_{k-1}=0$, $Z_k=E_k=0$ is true. If $Z_{k-1}=E_{k-1}=1$, the following equations (7) are true:

$$e_{k-1} = Z_{k-1} = 1, \quad E_k = e_k, \quad Z_k = \overline{z_k} \tag{7}$$

Accordingly, if it is shown that the following equation (8) is true, it can be proved by mathematical induction that Equation (3) is equal to E.

$$e_k = \overline{z_k} \tag{8}$$

From Equations (2), $$z_k = V_{k-1} \oplus W_{k-1} = [(P_{k-1} \cdot \overline{D_{k-1}}) + G_{k-1}] \oplus (P_k \oplus D_k) \tag{9}$$

From Equations (1) and (7), $$D_{k-1} = r_{k-1} = P_{k-1} \oplus C_{k-2} \tag{10}$$

Hence, from Equations (9) and (10), obtained is $$\begin{aligned} z_k &= [(P_{k-1} * C_{k-2}) + G_{k-1}] \oplus (P_k \oplus D_k) \\ &\quad (C_{k-1} \oplus P_k) \oplus D_k = r_k \oplus D_k = \overline{e_k} \end{aligned} \tag{11}$$

It is thereby shown that Equation (8) is true.

As to the FAC circuit $40a_1$ in which $V_0=1$, similarly E=1 when R+(0 ... 01)=K, and otherwise E=0.

Referring to FIGS. 2 to 4, the operation of the FAC-CAM circuit 3 will be discussed. Let us assume that a decoded instruction requires fetching data from the register file, for example, for memory access.

To fetch data from the register file, it is needed to obtain a physical address. Obtaining the physical address needs a virtual address. As discussed earlier, in order to obtain the virtual address, the addition operation of two data 1 and 2 must be performed, where the 20 high-order bits 1u and 2u of the data 1 and 2 are given to the first improved FAC circuit $30_i$ and the 12 low-order bits 1d and 2d of the data 1 and 2 are given to the adder 31.

Since the adder 31 performs an addition operation of 12-bit values, the result is obtained with considerably high speed as compared with the addition operation of 32-bit values made in the background art to obtain the virtual address. In consequence of the addition operation, the carry signal 32 indicating whether a carry is generated or not is applied to the first improved FAC circuit $30_i$.

As discussed earlier, the first improved FAC circuit $30_i$ performs the addition operation of the high-order bits 1u and 2u of the data 1 and 2 and the comparison between the addition result and a 20-bit value dependent on the value $D_k$ stored in the storage element $51_k$ with high speed. In the first improved FAC circuit $30_i$, both of the FAC circuits $40a_0$ and $40a_1$ perform the addition operation and comparison, according to the case of non-carry generation and the case of carry generation, respectively, as the result of the addition operation of the 12 low-order bits 1d and 2d of the data 1 and 2.

Specifically, when no carry is generated as the result of the addition operation of the 12 low-order bits 1d and 2d of the data 1 and 2, the carry signal 32 indicates "0" and the output $44_0$ from the FAC circuit $40a_0$ is obtained as a correct comparison result. When a carry is generated as the result of the addition operation of the 12 low-order bits 1d and 2d of the data 1 and 2, the carry signal 32 indicates "1" and the output $44_1$ from the FAC circuit $40a_1$ is obtained as a correct comparison result.

Thus, providing two circuits corresponding to the two possible values that the carry signal 32 may indicate and performing the addition operation and comparison together of the high-order bits of the two data simultaneously in the two circuits can avoid the necessity for waiting until the carry signal 32 is obtained. In other words, it becomes possible to simultaneously perform the addition operation of the 12 low-order bits of the two data and the addition operation and comparison together of the high-order bits of the two data. Furthermore, since propagation of the carry signal in the FAC circuit $40a_j$ is limited between the adjacent bits, the outputs $44_0$ and $44_1$ can be obtained with higher speed than the carry signal 32.

The selection circuit 41 outputs either of the two outputs $44_0$ and $44_1$ based on the carry signal 32, which is the correct comparison result, as the coincidence signal $5_i$.

When at least one coincidence signal $5_i$ is "1", indicating coincidence, the hit signal 8 becomes "1" to notice the processor of success of the address translation. Then, data specified by an address corresponding to the coincidence signal of "1" among the group of coincidence signals 5 is outputted as the physical address 7 (shown in FIG. 1).

Furthermore, in the FAC element $50_k$ for the most significant bit (herein $50_{20}$), the AND circuit $58_{20}$ and the OR circuit $52_{20}$ can be omitted to reduce the number of elements. That is because the FAC element $50_{20}$ for the most significant bit has no necessity of outputting the carry $V_{20}$.

In the present invention, there arises a problem in a configuration of FAC-CAM circuit 3 in which the FAC circuits shown in the above document are merely provided in parallel. The FAC circuit can obtain a correct comparison result only when all of the bits of the data are compared. In the case of 32-bit data, for example, all of 32 bits must be compared to obtain the correct comparison result. Generally, the TLB circuit 91 compares several bits in the high-order position, and does not need to compare the other bits in the lower-order position. In the TLB circuit 91, however, the carry to be generated as the result of the addition operation of the low-order bits must be taken into account.

For this reason, the present invention does not simply use the FAC circuit as the FAC-CAM circuit 3. The FAC-CAM circuit 3 of the present invention includes the adder 31 for performing an addition operation of the low-order bits to output the carry signal 32 indicating whether there generates a carry or not, a pair of FAC circuits $40a_0$ and $40a_1$ for obtaining a comparison result according to whether or not a carry is generated, respectively. Therefore, the selection circuit 41 for outputting either the output $44_0$ from the FAC circuit $44a_0$ or the output $44_1$ from the FAC circuit $44a_1$ as the coincidence signal $5_i$ is further included.

Figure 5:
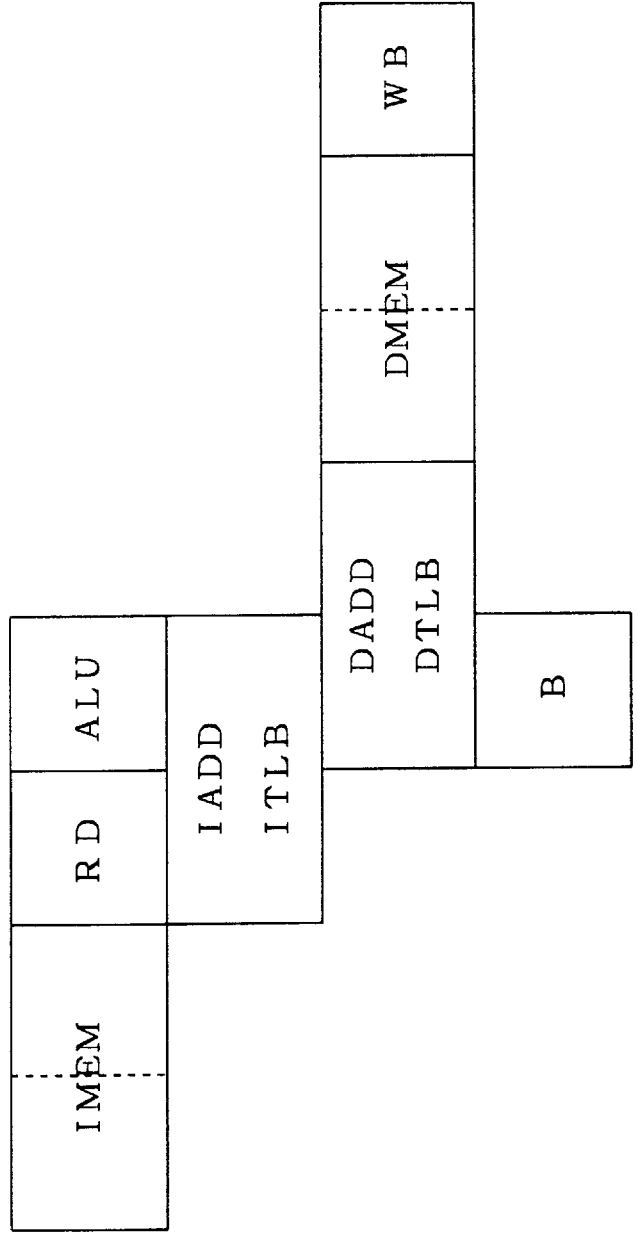
FIG. 5 is a schematic view showing the first preferred embodiment of the present invention.

FIG. 5 is a schematic view of a pipeline in which the TLB circuit 91 in accordance with the first preferred embodiment is used. In this figure, simultaneous processings of Stages "ITLB" and "IADD" and of Stages "DTLB" and "DADD" are made, and therefore, there is no hindrance, due to the long execution time for obtaining the physical address 7, to improvement in the processor performance.

In the above document, since the FAC circuit is used for branch judgment and computation of branch target address, there may be a case where the instruction should change depending on whether or not the FAC circuit is used. That is, there may be a case where a software used before employing the FAC circuit should change. In contrast, the present invention has no necessity for changing a software. What the present invention achieves is only to cut the execution time of pipeline processing to execute an instruction, and accordingly, no other change is required.

The Second Preferred Embodiment

Figure 6:
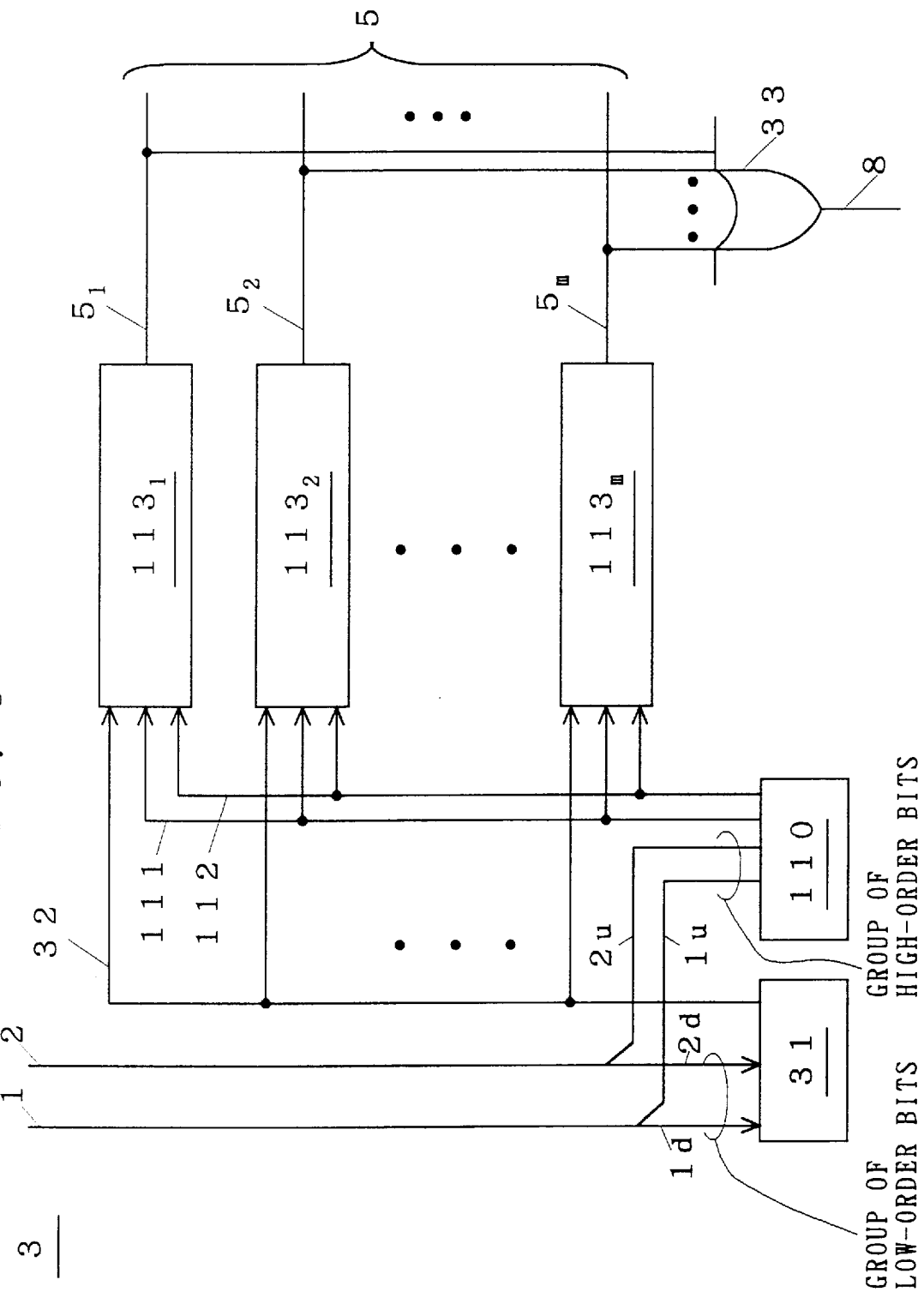
FIG. 6 is a block diagram showing a second preferred embodiment of the present invention.

FIG. 6 is a block diagram of an alternative configuration of the FAC-CAM circuit 3. In the FAC-CAM circuit 3 of FIG. 6, compared with the FAC-CAM circuit 3 of FIG. 2, a group of half-adders 110 is additionally provided and the second improved FAC circuits $113_i$ (i=1, 2, . . . , m) is provided instead of the first improved FAC circuits $30_i$.

The second improved FAC circuit $113_i$ is not directly provided with the high-order bits $1u$ and $2u$ of the data 1 and 2, unlike the first improved FAC circuit $30_i$. Instead, the second improved FAC circuit $113_i$ is provided with an addition result 111 and a resultant carry 112 from the group of half-adders 110. The addition result 111 and the resultant carry 112 are obtained by performing an addition operation of the high-order bits $1u$ and $2u$ by bit in the group of half-adders 110.

Figure 7:
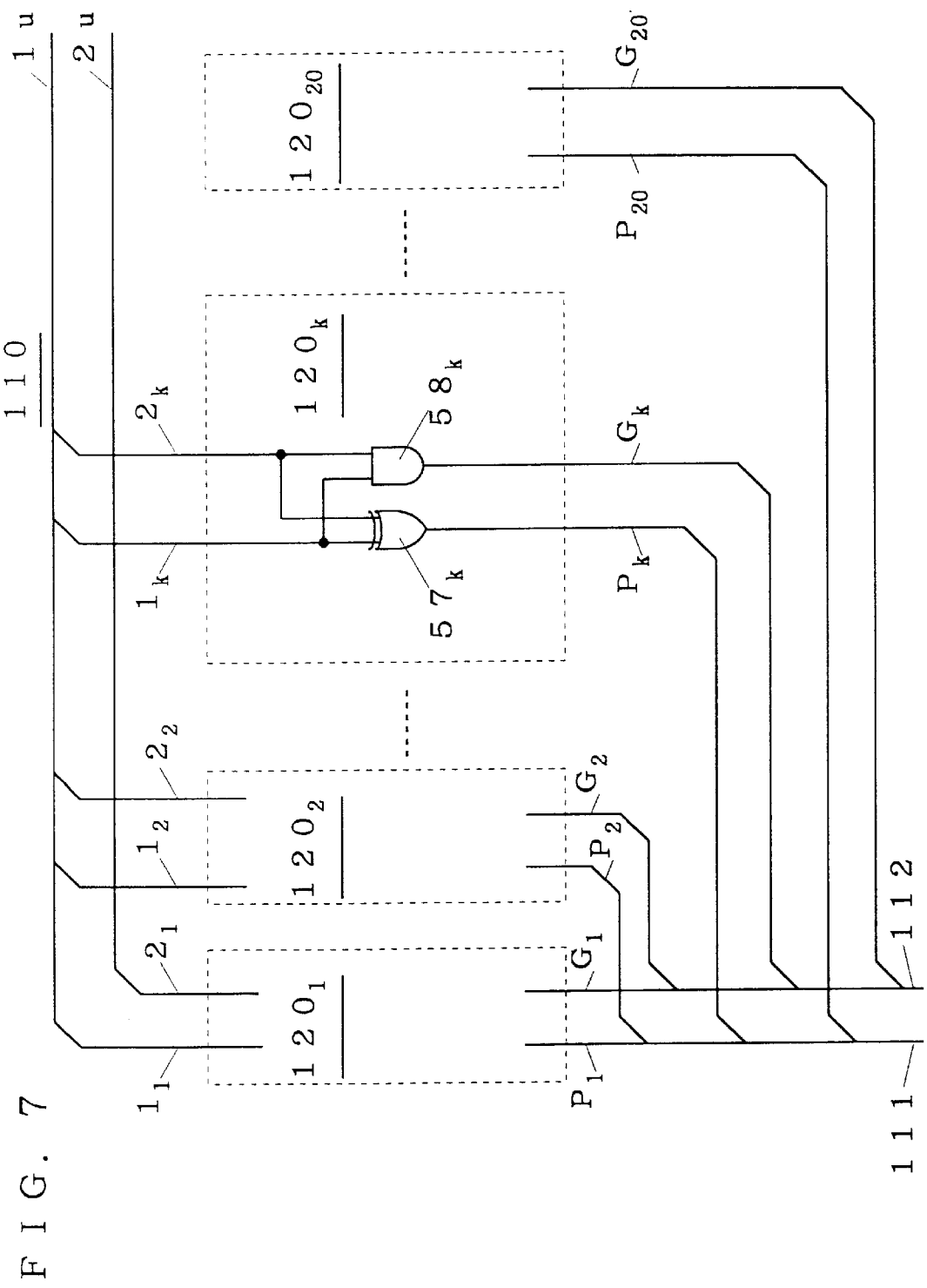
FIGS. 7 to 9 are circuit diagrams showing the second preferred embodiment of the present invention.

FIG. 7 is a circuit diagram of a configuration of the group of half-adders 110. The group of half-adders 110 consists of half-adders $120_k$ as much as the number of high-order bits to be computed (herein 20, k=1, 2, . . . , 20), and the high-order bits $1u$ and $2u$ of the data 1 and 2 are applied thereto by bit. That is, the half-adder $120_k$ is provided with 1-bit values $1_k$ and $2_k$ which are the k-th bit values from the bottom of the high-order bits $1u$ and $2u$.

The half-adder $120_k$ has the same configuration as the half-adder $59_k$ of the FAC element $50_k$, obtaining the sum $P_k$ and the carry $G_k$. The addition result 111 and the resultant carry 112 are obtained as $(P_1\ P_2\ \ldots\ P_k\ \ldots\ P_{20})$, $(G_1\ G_2\ \ldots\ G_k\ \ldots\ G_{20})$.

At this time, the outputs $P_k$ and $G_k$ are obtained independently by bit (without carry propagation). Therefore, the addition result 111 and the resultant carry 112 can be obtained with significantly high speed.

Figure 8:
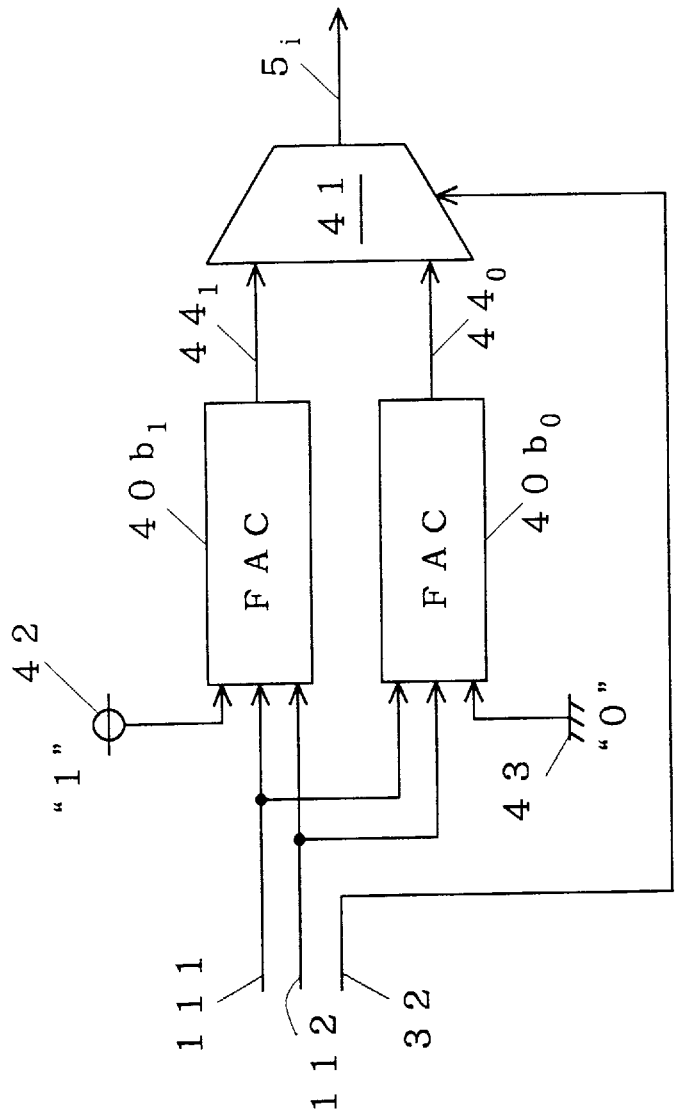

FIG. 8 is a circuit diagram of a configuration of the second improved FAC circuit $113_i$. In the second improved FAC circuit $113_i$ of FIG. 8, compared with the first improved FAC circuit $30_i$ of FIG. 3, FAC circuits $40b_0$ and $40b_1$ are provided instead of the FAC circuits $40a_0$ and $40a_1$. The FAC circuits $40b_0$ and $40b_1$ are both provided with the addition result 111 and the resultant carry 112 instead of the high-order bits $1u$ and $2u$.

Figure 9:
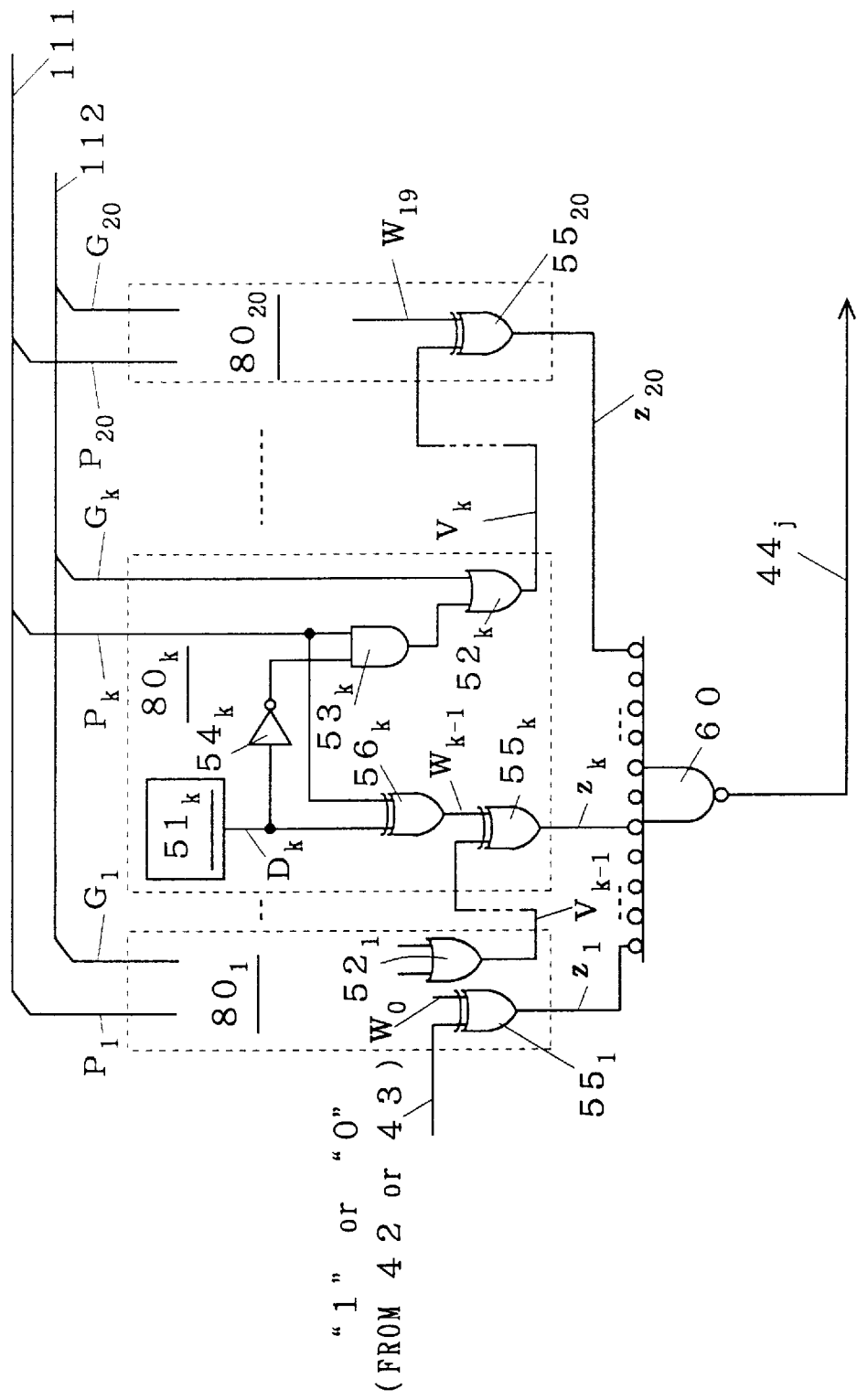

FIG. 9 is a circuit diagram of a configuration of the FAC circuit $40b_j$ (j=0, 1). Each of FAC circuits $40b_j$ is comprised of 1-bit FAC elements $80_k$ (k=1, 2, . . . 20) and the NOR circuit 60 with 20-bit input. In the FAC circuit $40b_j$, compared with the FAC circuit $40a_j$, FAC elements $80_k$ are provided instead of the FAC elements $50_k$.

Furthermore, the FAC element $80_k$ does not need the half-adder $59_k$ since the addition result 111 and the resultant carry 112 has been already obtained. In the first preferred embodiment, the half-adders $59_k$ perform the same processing both in the FAC circuits $40a_0$ and $40a_1$. In the second preferred embodiment, the group of half-adders 110 has the same function as the half-adders $59_k$. That is, in the second preferred embodiment, the respective half-adders $59_k$ of the FAC circuits $40a_0$ and $40a_1$ are common to the FAC circuit $40b_0$ and $40b_1$ as the group of half-adders 110.

Having such a configuration, the FAC circuit $40b_j$ obviously performs the same operation as the FAC circuit $40a_j$. Accordingly, it is also obvious that the second improved FAC circuit $113_i$ performs the same operation as the first improved FAC circuit $30_i$, and further the FAC-CAM circuit 3 of FIG. 6 performs the same operation as the FAC-CAM circuit of FIG. 2.

On the other hand, $(P_1\ P_2\ \ldots\ P_k\ \ldots\ P_{20})$ and $(G_1\ G_2 \ldots G_k \ldots G_{20})$ are obtained both in the two FAC circuits $40a_j$ in the first preferred embodiment. For simplicity, assuming the FAC element $50_{20}$ for the most significant bit also has the half-adder $59_{20}$, the number of the required half-adders is twice the number of the high-order bits, i.e., forty half-adders are required for 20 high-order bits. In the second preferred embodiment, in contrast, since ($P_1$ $P_2$ . . . $P_k$ . . . $P_{20}$) and ($G_1$ $G_2$ . . . $G_k$ . . . $G_{20}$) are obtained by the group of half-adders 110, the number of the required half-adders $120_k$, corresponding to the half-adder $59_k$, is only twenty, which is equal to the number of the high-order bits.

Thus, since the function performed by two FAC circuits is achieved by one operation in the second preferred embodiment, the number of elements are reduced without degrading the operation speed, thereby improving integration level.

The Third Preferred Embodiment

The third preferred embodiment provides an alternative configuration of the second improved FAC circuit $113_i$ in accordance with the second preferred embodiment, also using the configuration of the FAC-CAM circuit 3 of FIG. 6.

Figure 10:
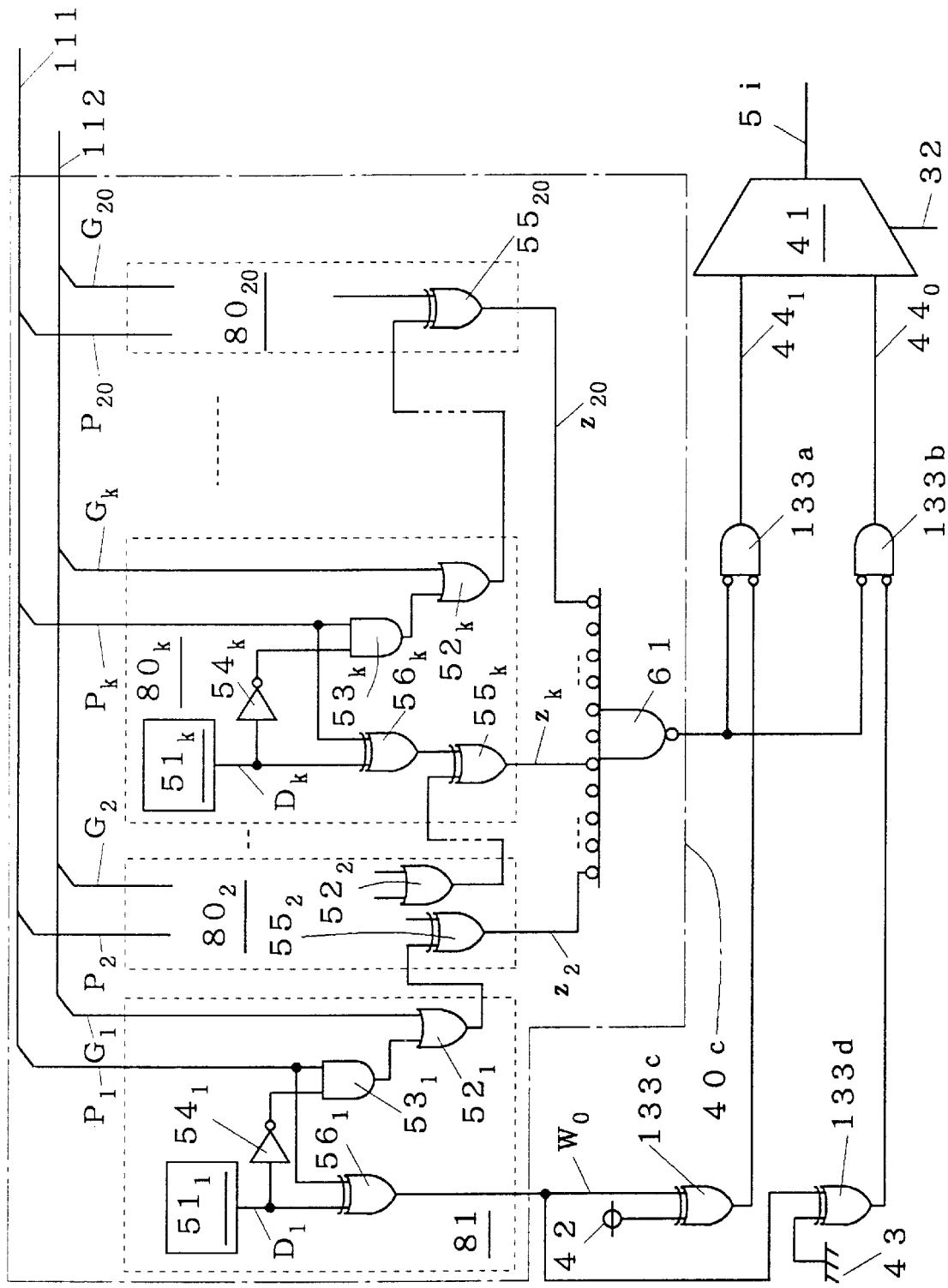
FIG. 10 is a circuit diagram showing a third preferred embodiment of the present invention.
Figure 12:
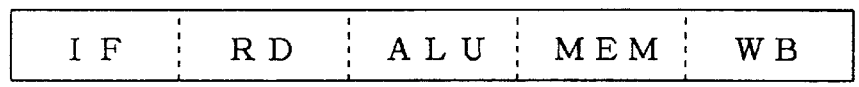
Figure 13:
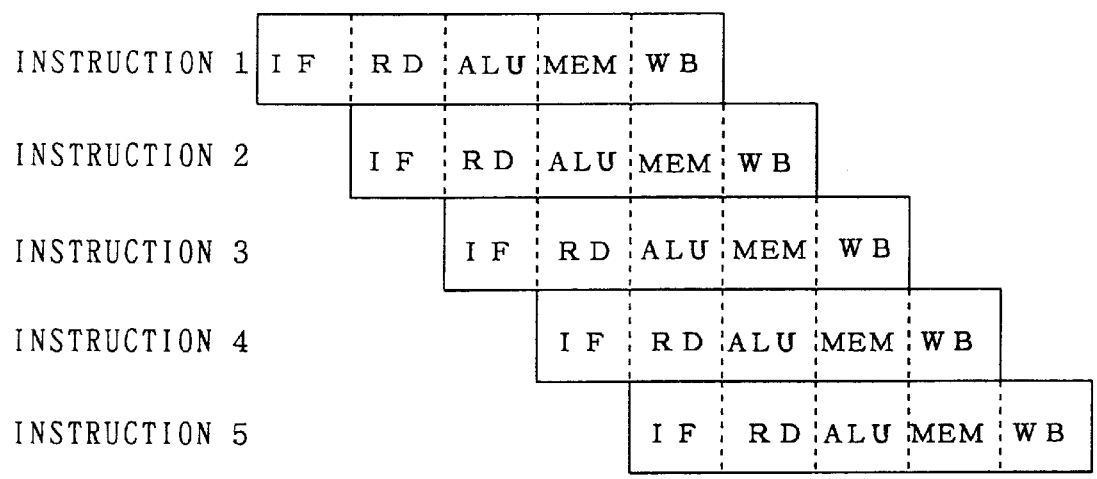
Figure 1:
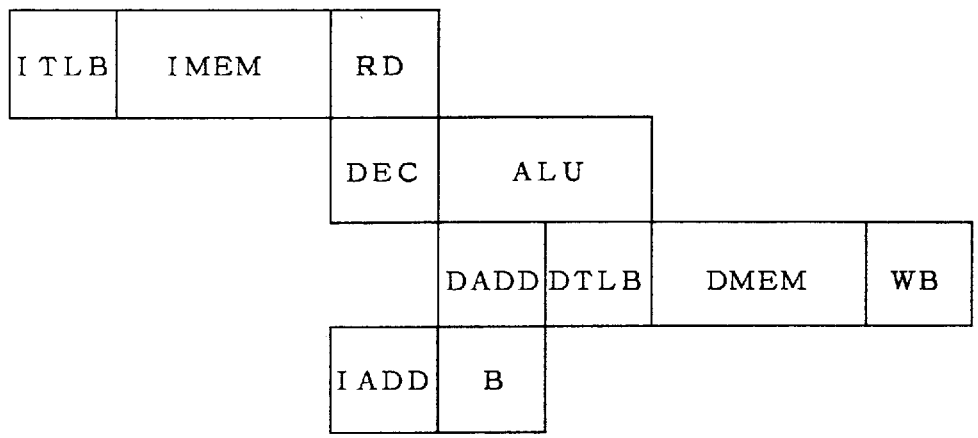
Figure 1:
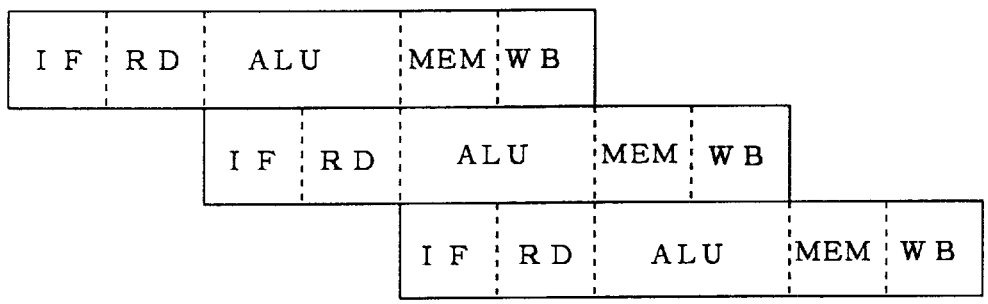
Figure 16:
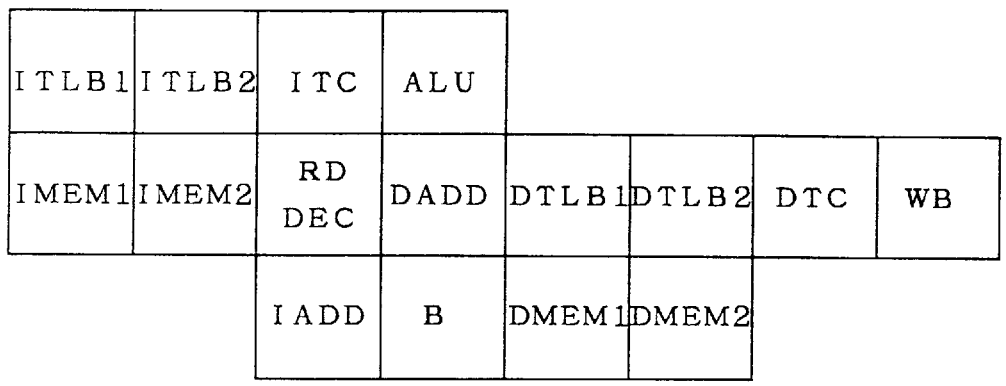
Figure 17:
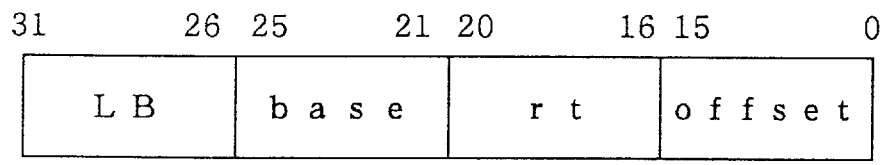
Figure 18:
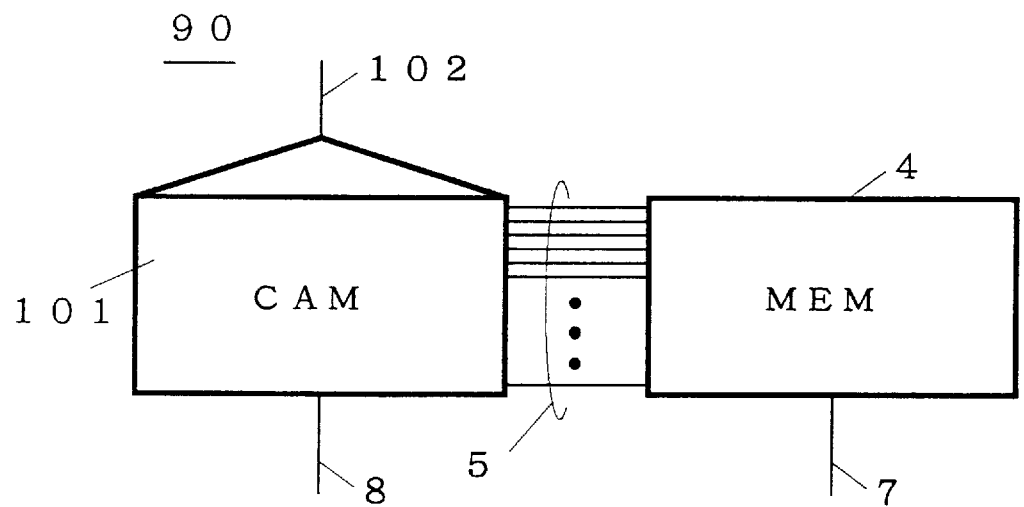
FIG. 18 is a block diagram showing the background art.

FIG. 10 is a circuit diagram of an alternative configuration of the second improved FAC circuit $113_i$. In this figure, the selection circuit 41 for outputting either the output $44_0$ or $44_1$ according to the carry signal 32, like the circuit of FIG. 8. Unlike the second preferred embodiment, the outputs $44_0$ and $44_1$ are not outputted from different FAC circuits. In the third preferred embodiment, each of the second improved FAC circuits $113_i$ has a FAC circuit 40c. Since most of the functions of the FAC circuits $40b_0$ and $40b_1$ of the second preferred embodiment are common, the FAC circuit 40c performs the common functions and another elements additionally provided perform those which are not common in the third preferred embodiment to reduce the number of elements.

The FAC circuit $113_i$ is comprised of, besides the selection circuit 41 and the FAC circuit 40c, the potential point 42 supplying a potential of logic "1", the potential point 43 supplying a potential of logic "0", NOR circuits 133a and 133b, EX-OR circuits 133c and 133d, and an OR circuit 61 with input ends, the number of which is one fewer than the number of the high-order bits (herein 20−1=19).

The FAC circuit 40c is comprised of FAC elements $80_k$ (k=2, 3, . . . , 20), the number of which is one fewer than the number of the high-order bits 1u, 2u, herein 20−1=19. The configuration of the FAC element $80_k$ is as discussed in the second preferred embodiment referring to FIG. 9. The output $z_k$ of the FAC element $80_k$ is applied to the OR circuit 61.

In the FAC circuit 40c, a FAC element 81 for receiving the inputs $P_1$ and $G_1$ is provided, instead of the FAC element $80_1$ of the FAC circuits $40b_0$ and $40b_1$.

In the FAC element 81, the EX-OR circuit $55_k$ of the FAC element $80_k$ is not provided. Instead, the EX-OR circuits 133c and 133d performs the same functions as the EX-OR circuit $55_1$ of the FAC element $80_1$ in the FAC circuits $40b_0$ and $40b_1$.

In the second preferred embodiment, the FAC elements $80_k$ (k=2, 3, . . . , 20) performs the same operation both in the FAC circuits $40b_0$ and $40b_1$. Only the FAC elements $80_1$ for the least significant bit of the FAC circuits $40b_0$ and $40b_1$ perform the different operations from each other. The different operations depend upon which of the potential points 42 and 43 is connected to one input end of the EX-OR circuit $55_1$.

In the third preferred embodiment, the respective one ends of both the EX-OR circuits 133c and 133d are given the output $W_0$ from the EX-OR circuit $56_1$, and the other end of the EX-OR circuit 133c is connected to the potential point 42 and the other end of the EX-OR circuit 133d is connected to the potential point 43. Specifically, the EX-OR circuit 133c is an alternative to the EX-OR circuit $55_1$ of the FAC element $80_1$ in the FAC circuit $40b_1$ and the EX-OR circuit 133d is an alternative to the EX-OR circuit $55_1$ of the FAC element $80_1$ in the FAC circuit $40b_0$.

Accordingly, the output of the EX-OR circuit 133c corresponds to the output $z_1$ of the FAC circuit $40b_1$ and the output of the EX-OR circuit 133d corresponds to the output $z_1$ of the FAC circuit $40b_0$. The output of the NOR circuit 133a taking a logical product of the logic inversion of the output of the EX-OR circuit 133c and the logic inversion of the output of the OR circuit 61 is obtained as the output $44_1$. Likewise, The output of the NOR circuit 133b taking a logical product of the logic inversion of the output of the EX-OR circuit 133d and the logic inversion of the output of the OR circuit 61 is obtained as the output $44_0$.

Thus, the circuit of FIG. 10 performs the same operation as the circuit of FIG. 8. In the third preferred embodiment, only the FAC circuit 40c performs the common functions of the FAC circuits $40b_0$ and $40b_1$ of the second preferred embodiment, thereby reducing the number of the elements.

FIG. 11 is a comparison table of the number of transistors required in the first preferred embodiment and the third preferred embodiment, respectively, in 32-word data conversion where the 20-bit value in the high-order position of 32-bit address data is converted by the TLB circuit. For simplicity of calculation, it is assumed that the number of elements provided in an FAC element are equal, regardless of the bit position which the FAC element corresponds to. From this table, it can be seen that the third preferred embodiment requires only about one-third transistors to achieve the configuration of the FAC-CAM circuit 3 as compared with the first preferred embodiment.

While the invention has been shown and described in detail, the foregoing description is in all aspects illustrative and not restrictive. It is therefore understood that numerous modifications and variations can be devised without departing the scope of the invention.

I claim:

1. An associative memory circuit for performing an addition operation of a first value and a second value, said first value consisting of a first number of first high-order bits and a second number of first low-order bits, said second value consisting of a third number of second high-order bits and said second number of second low-order bits, said third number being less than said first number, and judging whether or not a result of said addition operation coincides with one of plural internally stored comparison values each having said first number of bits, the associative memory circuit comprising:

(a) an adder for generating a carry signal to indicate whether or not a first result of a first addition operation of said first low-order bits and said second low-order bits generates a carry to be propagated out of said second number of bits;

(b) coincidence judging circuits provided corresponding to said plural internally stored comparison values, each for outputting a coincidence signal to indicate whether or not a second result of a second addition operation of 1) said first high-order bits, 2) said second high-order bits, where said first and second high-order bits are lower-bit aligned, and 3) a logical value of said carry signal applied at a least significant bit thereof, is equivalent to a corresponding one of said plural internally stored comparison values, wherein each of said coincidence judging circuits comprises
- (b-1) a first FAC circuit for outputting a first candidate for said coincidence signal to indicate whether or not said second result of said second addition operation of 1) said first high-order bits, 2) said second high-order bits, and 3) a logical value "0" is equivalent to said corresponding one of said plural internally stored comparison values;
- (b-2) a second FAC circuit for outputting a second candidate for said coincidence signal to indicate whether or not said second result of said second addition operation of 1) said first high-order bits, 2) said second high-order bits, and 3) a logical value "1" is equivalent to said corresponding one of said plural internally stored comparison values; and
- (b-3) a selection circuit for outputting either said first candidate or said second candidate as said coincidence signal according to said carry signal.

2. The associative memory circuit of claim 1, wherein said selection circuit outputs said first candidate as said coincidence signal when said carry signal takes a logical value "0" and outputs said second candidate as said coincidence signal when said carry signal takes a logical value "1".

3. The associative memory circuit of claim 1, wherein both the said first FAC circuit and said second FAC circuit comprise
- (x-1) said first number of FAC elements, each of said first number of FAC elements including
  - (x-1-1) a storage element for internally storing a 1-bit comparison value which forms a portion of said corresponding one of said comparison values;
  - (x-1-2) a half-adder for receiving a first 1-bit value forming a portion of said first high-order bits and a second 1-bit value forming a portion of said second high-order bits, and outputting an addition result which is an exclusive logical sum of said first 1-bit value and said second 1-bit value and a resultant carry which is a logical product of said first 1-bit value and said second 1-bit value; and
  - (x-1-3) a logic circuit for applying a prescribed operation to said addition result, said resultant carry and said 1-bit comparison value to output a first output and a second output in each of said first number of FAC elements, and
- (x-2) coincidence signal candidate generator means for outputting a logical NOR of said first outputs 1) as said first candidate in said first FAC circuit and 2) as said second candidate in said second FAC circuit, and said logic circuit comprising:
- (y-1) a first circuit for calculating a logical product of said addition result and a logic inversion of said 1-bit comparison value to obtain a first operation result;
- (y-2) a second circuit for calculating a logical sum of said first operation result and said resultant carry to obtain said second output;
- (y-3) a third circuit for calculating an exclusive logical sum of said addition result and said 1-bit comparison value to obtain a second operation result; and
- (y-4) a fourth circuit for calculating an exclusive logical sum of said second output from a next lower one of said FAC elements and said second operation result to obtain said first output, wherein said second output applied to a least significant FAC element of said first number of FAC elements corresponds to said logical value "0" in said first FAC circuit and corresponds to said logical value "1" in said second FAC circuit.

4. The associative memory circuit of claim 3, wherein
said first circuit comprises an AND circuit for outputting said first operation result;
said second circuit comprises an OR circuit for outputting said second output;
said third circuit comprises a first EX-OR circuit for outputting said second operation result; and
said fourth circuit comprises a second EX-OR circuit for outputting said first output.

5. The associative memory circuit of claim 3, wherein
said half-adders are common to said first FAC circuit and said second FAC circuit by bit to form a group of half-adders.

6. The associative memory circuit of claim 5, wherein all of said FAC elements are common by bit to said first FAC circuit and said second FAC circuit,
wherein, in each of said first number of FAC elements not corresponding to said least significant bit,
said first circuit comprises an AND circuit for outputting said first operation result;
said second circuit comprises an OR circuit for outputting said second output;
said third circuit comprises a first EX-OR circuit for outputting said second operation result; and
said fourth circuit comprises a second EX-OR circuit for outputting said first output,
wherein, in said least significant FAC element,
said first circuit comprises an AND circuit for outputting said first operation result;
said second circuit comprises an OR circuit for outputting said second output; and
said third circuit comprises a first EX-OR circuit for outputting said second operation result,
wherein each of said coincidence judging circuits further comprises
- (b-4) a first transfer element for transferring said second operation result of said least significant FAC element of said first FAC circuit as said first output of said first FAC circuit;
- (b-5) a second transfer element for transferring said second operation result of said least significant FAC element of said second FAC circuit as said first output of said second FAC circuit; and said coincidence signal candidate generator means comprising
- (x-2-1) a first logical element for outputting a logical sum of said first outputs of said first number of FAC elements not corresponding to said least significant bit;
- (x-2-2) a second logical element for outputting an inverted logical sum of an output from said first transfer element and an output from said first logical element as said first candidate for said coincidence signal; and
- (x-2-3) a third logical element for outputting an inverted logical sum of an output from said second transfer element and said output of said first logical element as said second candidate for said coincidence signal.

7. The associative memory circuit of claim 6, wherein
said second transfer element includes a first input end for receiving said second operation result of said least significant FAC element, a second input end for receiving said logical value "1", and an output end for outputting an exclusive logical sum of two logic signals received by said first and second input ends.

8. The associative memory circuit of claim 7, wherein said first transfer element includes a first input end for receiving said second operation result of said least significant FAC element, a second input end for receiving said logical value "0" and an output end for outputting an exclusive logical sum of two logic signals received by said first and second input ends.

9. The associative memory circuit of claims 1, further comprising:
(c) a hit signal generator means for outputting a hit signal by taking a logical sum of all of said coincidence signals.

10. A TLB circuit, comprising:
the associative memory circuit for performing an addition operation of a first value and a second value, said first value consisting of a first number of first high-order bits and a second number of first low-order bits, said second value consisting of a third number of second high-order bits and said second number of second low-order bits, said third number being less than said first number, and judging whether or not a result of said addition operation coincides with one of plural internally stored comparison values each having said first number of bits, the associative memory circuit comprising:
(a) an adder for generating a carry signal to indicate whether or not a first result of a first addition operation of said first low-order bits and said second low-order bits generates a carry to be propagated out of said second number of bits;
(b) coincidence judging circuits provided corresponding to said plural internally stored comparison values, each for outputting a coincidence signal to indicate whether or not a second result of a second addition operation of 1) said first high-order bits, 2) said second high-order bits, where said first and second high-order bits are lower-bit aligned, and 3) a logical value of said carry signal applied at a least significant bit thereof, is equivalent to a corresponding one of said plural internally stored comparison values,
wherein each of said coincidence judging circuits comprises
(b-1) a first FAC circuit for outputting a first candidate for said coincidence signal to indicate whether or not said second result of said second addition operation of 1) said first high-order bits, 2) said second high-order bits, and 3) a logical value "0" is equivalent to said corresponding one of said plural internally stored comparison values;
(b-2) a second FAC circuit for outputting a second candidate for said coincidence signal to indicate whether or not said second result of said second addition operation of 1) said first high-order bits, 2) said second high-order bits, and 3) a logical value "1" is equivalent to said corresponding one of said plural internally stored comparison values; and
(b-3) a selection circuit for outputting either said first candidate or said second candidate as said coincidence signal according to said carry signal.

11. The TLB circuit of claim 10, wherein said selection circuit outputs said first candidate as said coincidence signal when said carry signal takes a logical value "0" and outputs said second candidate as said coincidence signal when said carry signal takes a logical value "1".

12. The TLB circuit of claims 10, wherein both the said first FAC circuit and said second FAC circuit comprise
(x-1) said first number of FAC elements, each of said first number of FAC elements including
(x-1-1) a storage element for internally storing a 1-bit comparison value which forms a portion of said corresponding one of said comparison values;
(x-1-2) a half-adder for receiving a first 1-bit value forming a portion of said first high-order bits and a second 1-bit value forming a portion of said second high-order bits, and outputting an addition result which is an exclusive logical sum of said first 1-bit value and said second 1-bit value and a resultant carry which is a logical product of said first 1-bit value and said second 1-bit value; and
(x-1-3) a logic circuit for applying a prescribed operation to said addition result, said resultant carry and said 1-bit comparison value to output a first output and a second output in each of said first number of FAC elements, and
(x-2) coincidence signal candidate generator means for outputting a logical NOR of said first outputs 1) as said first candidate in said first FAC circuit and 2) as said second candidate in said second FAC circuit, and
said logic circuit comprising:
(y-1) a first circuit for calculating a logical product of said addition result and a logic inversion of said 1-bit comparison value to obtain a first operation result;
(y-2) a second circuit for calculating a logical sum of said first operation result and said resultant carry to obtain said second output;
(y-3) a third circuit for calculating an exclusive logical sum of said addition result and said 1-bit comparison value to obtain a second operation result; and
(y-4) a fourth circuit for calculating an exclusive logical sum of said second output from a next lower one of said FAC elements and said second operation result to obtain said first output,
wherein said second output applied to a least significant FAC element of said first number of FAC elements corresponds to said logical value "0" in said first FAC circuit and corresponds to said logical value "1" in said second FAC circuit.

13. The TLB circuit of claim 12, wherein said first circuit comprises an AND circuit for outputting said first operation result;
said second circuit comprises an OR circuit for outputting said second output;
said third circuit comprises a first EX-OR circuit for outputting said second operation result; and
said fourth circuit comprises a second EX-OR circuit for outputting said first output.

14. The TLB circuit of claim 12, wherein said half-adders are common to said first FAC circuit and said second FAC circuit by bit to form a group of half-adders.

15. The TLB circuit of claims 14, wherein all of said FAC elements are common by bit to said first FAC circuit and said second FAC circuit,
wherein, in each of said first number of FAC elements not corresponding to said least significant bit,
said first circuit comprises an AND circuit for outputting said first operation result;

said second circuit comprises an OR circuit for outputting said second output;

said third circuit comprises a first EX-OR circuit for outputting said second operation result; and said fourth circuit comprises a second EX-OR circuit for outputting said first output, wherein, in said least significant FAC element, said first circuit comprises an AND circuit for outputting said first operation result;

said second circuit comprises an OR circuit for outputting said second output; and said third circuit comprises a first EX-OR circuit for outputting said second operation result, wherein each of said coincidence judging circuits further comprises
- (b-4) a first transfer element for transferring said second operation result of said least significant FAC element of said first FAC circuit as said first output of said first FAC circuit;
- (b-5) a second transfer element for transferring said second operation result of said least significant FAC element of said second FAC circuit as said first output of said second FAC circuit; and said coincidence signal candidate generator means comprising
- (x-2-1) a first logical element for outputting a logical sum of said first outputs of said first number of FAC elements not corresponding to said least significant bit;
- (x-2-2) a second logical element for outputting an inverted logical sum of an output from said first transfer element and an output from said first logical element as said first candidate for said coincidence signal; and
- (x-2-3) a third logical element for outputting an inverted logical sum of an output from said second transfer element and said output of said first logical element as said second candidate for said coincidence signal.

16. The TLB circuit of claim 15, wherein said second transfer element includes a first input end for receiving said second operation result of said least significant FAC element, a second input end for receiving said logical value "1", and an output end for outputting an exclusive logical sum of two logic signals received by said first and second input ends.

17. The TLB circuit of claim 16, wherein said first transfer element includes a first input end for receiving said second operation result of said least significant FAC element, a second input end for receiving said logical value "0" and an output end for outputting an exclusive logical sum of two logic signals received by said first and second input ends.

18. The TLB circuit of claim 10, further comprising:
- (c) a hit signal generator means for outputting a hit signal by taking a logical sum of all of said coincidence signals.

* * * * *